United States Patent
Wang et al.

(10) Patent No.: US 11,968,111 B2
(45) Date of Patent: Apr. 23, 2024

(54) PACKET SCHEDULING METHOD, SCHEDULER, NETWORK DEVICE, AND NETWORK SYSTEM

(71) Applicant: Huawei Technologies Co., Ltd., Shenzhen (CN)

(72) Inventors: Tongtong Wang, Beijing (CN); Xinyuan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 151 days.

(21) Appl. No.: 17/390,373

(22) Filed: Jul. 30, 2021

(65) Prior Publication Data

US 2021/0359931 A1    Nov. 18, 2021

Related U.S. Application Data

(63) Continuation of application No. PCT/CN2019/074718, filed on Feb. 3, 2019.

(51) Int. Cl.
*H04L 47/56* (2022.01)
*H04L 45/12* (2022.01)
(Continued)

(52) U.S. Cl.
CPC .......... *H04L 45/123* (2013.01); *H04L 45/124* (2013.01); *H04L 45/42* (2013.01);
(Continued)

(58) Field of Classification Search
CPC ..... H04L 45/123; H04L 45/124; H04L 45/42; H04L 47/2408; H04L 47/562;
(Continued)

(56) References Cited

U.S. PATENT DOCUMENTS

2003/0058817 A1    3/2003   Asai
2008/0298380 A1*  12/2008   Rittmeyer ............... H04L 47/50
                                                    370/395.42
(Continued)

FOREIGN PATENT DOCUMENTS

CN    102223306 A    10/2011
CN    106559354 A     4/2017
(Continued)

OTHER PUBLICATIONS

IEEE Std 802.1ASTM, "IEEE Standard for Local and metropolitan area networks—Timing and Synchronization for Time-Sensitive Applications in Bridged Local Area Networks," Mar. 30, 2011, 292 pages.

(Continued)

*Primary Examiner* — Abdulkader M Alriyashi
(74) *Attorney, Agent, or Firm* — Conley Rose, P.C.

(57) ABSTRACT

A network device adds an extreme low latency (ELL) service packet to an ELL queue, and adds a (time sensitive) TS service packet to a TS queue. A packet in the TS queue is sent within a time window corresponding to the TS queue, and the packet in the TS queue is not allowed to be sent within a time period beyond the time window corresponding to the TS queue. When a remaining time period obtained by subtracting a time period required by a to-be-sent TS service packet within the time window from the time window is greater than or equal to a first threshold, a packet in the ELL queue is allowed to be sent within the time window corresponding to the TS queue. The first threshold is a time period required for sending one or more ELL service packets in the ELL queue.

21 Claims, 6 Drawing Sheets

(51) Int. Cl.
*H04L 45/42* (2022.01)
*H04L 47/2408* (2022.01)
*H04L 47/6275* (2022.01)

(52) U.S. Cl.
CPC ........ *H04L 47/2408* (2013.01); *H04L 47/562* (2013.01); *H04L 47/6275* (2013.01)

(58) Field of Classification Search
CPC . H04L 47/6275; H04L 47/50; H04L 47/6215; H04L 49/25; H04L 47/56
See application file for complete search history.

(56) References Cited

U.S. PATENT DOCUMENTS

| | | | |
|---|---|---|---|
| 2015/0271089 A1 | 9/2015 | Tang et al. | |
| 2017/0331748 A1* | 11/2017 | Mangin | H04L 47/826 |
| 2017/0366467 A1 | 12/2017 | Martin et al. | |
| 2018/0199381 A1 | 7/2018 | Rong et al. | |
| 2018/0270144 A1 | 9/2018 | Jiang et al. | |
| 2018/0300174 A1 | 10/2018 | Karanasos et al. | |

FOREIGN PATENT DOCUMENTS

| | | |
|---|---|---|
| CN | 108574645 A | 9/2018 |
| EP | 3057273 A1 | 8/2016 |
| JP | H11150577 A | 6/1999 |
| JP | 2001358722 A | 12/2001 |
| JP | 2004128989 A | 4/2004 |
| JP | 2017532870 A | 11/2017 |
| JP | 2018534873 A | 11/2018 |

OTHER PUBLICATIONS

IEEE Std 802.1QbvTM, "IEEE Standard for Local and metropolitan area networks—Bridges and Bridged Networks, Amendment 25: Enhancements for Scheduled Traffic," 2015, 57 pages.

* cited by examiner

PACKET SCHEDULING METHOD, SCHEDULER, NETWORK DEVICE, AND NETWORK SYSTEM

CROSS-REFERENCE TO RELATED APPLICATIONS

This is a continuation of Int'l Patent App. No. PCT/CN2019/074718, filed on Feb. 3, 2019, the disclosure of which is hereby incorporated by reference in its entirety.

FIELD

This disclosure relates to the field of communications technologies, and to a packet scheduling method, a scheduler, a network device, a network system, and a computer-readable storage medium.

BACKGROUND

A conventional quality of service (QoS) scheduling method ensures that each class of traffic is forwarded and transmitted as soon as possible by using a strict priority scheduling method or a round robin polling method that are flexibly configured. However, the conventional QoS scheduling method is difficult to ensure a forwarding latency.

At present and in the future, many applications require a bounded latency and an extreme low latency in an IP bearer network. Conventional IP Ethernet provides a network connection with high efficiency and an average low latency by using a QoS technology based on a best effort (BE) forwarding mechanism. Because burst and congestion on the network are unpredictable, a forwarding latency may be relatively high or a packet loss occurs on the network. For services sensitive to a latency and a packet loss, the conventional Ethernet cannot meet user requirements, and a time-division multiplexing (TDM) forwarding device is expensive and inflexible.

SUMMARY

This disclosure provides a packet scheduling method, a network device, a network system, and a computer-readable storage medium. These solutions can improve packet scheduling efficiency of a network device.

According to a first aspect, a packet scheduling method is provided. According to the method, a network device determines a type of a received packet. If the packet is an extreme low latency ELL service packet, the network device adds the packet to an ELL queue, and if the packet is a time sensitive TS service packet, adds the packet to a TS queue. A packet in the TS queue is sent within a time window corresponding to the TS queue, and the packet in the TS queue is not allowed to be sent within a time period beyond the time window corresponding to the TS queue. When a remaining time period obtained by subtracting a time period required by a to-be-sent TS service packet within the time window from the time window is greater than or equal to a first threshold, a packet in the ELL queue is allowed to be sent within the time window corresponding to the TS queue. The first threshold is a time period required for sending one or more ELL service packets in the ELL queue. According to the technical solutions, forwarding efficiency of the network device can be improved.

According to a second aspect, a scheduler is provided. The scheduler is configured to: allow a TS service packet in a time sensitive TS queue to be dequeued within a time window corresponding to the TS queue, and not allow the packet in the TS queue to be sent within a time period beyond the time window corresponding to the TS queue; and when a remaining time period obtained by subtracting a time period required by a to-be-sent TS service packet within the time window corresponding to the TS queue from the time window corresponding to the TS queue is greater than or equal to a first threshold, allow an ELL service packet in an extreme low latency ELL queue to be sent within the time window corresponding to the TS queue. The first threshold is a time period required for sending one or more ELL service packets in the ELL queue.

According to a third aspect, a network device is provided. The network device includes a port, a processor, and a scheduler. The processor is configured to determine a type of a packet received through the port. The type includes an extreme low latency ELL service packet and a time sensitive TS service packet. The scheduler is configured to: if the type of the packet is an ELL service packet, add the packet to an ELL queue; and if the type of the packet is a TS service packet, add the packet to a TS queue. A packet in the TS queue is sent within a time window corresponding to the TS queue. When a remaining time period obtained by subtracting a time period required by a to-be-sent TS service packet within the time window from the time window corresponding to the TS queue is greater than or equal to a first threshold, a packet in the ELL queue is allowed to be sent within the time window corresponding to the TS queue. The first threshold is a time period required for sending one or more ELL service packets in the ELL queue. The port is further configured to send the TS service packet in the TS queue and/or the ELL service packet in the ELL queue.

In some embodiments, when the ELL service packet in the ELL queue is sent within the time window corresponding to the TS queue, a priority of the ELL service packet in the ELL queue is higher than a priority of the TS service packet in the TS queue. In this case, when the ELL service packet in the ELL queue is allowed to be sent within the time window corresponding to the TS queue, the ELL service packet may be first sent for dequeuing, so as to ensure that the ELL service packet is forwarded as soon as possible. The ELL service packet is usually a relatively short service packet that needs to be forwarded as soon as possible based on some requirements, for example, emergency public information and policing information. The ELL service packet is short, requires a high priority, and occupies a limited bandwidth. Therefore, when it is ensured that the TS service packet can be forwarded normally, the ELL service packet is allowed to be first sent within the time window corresponding to the TS queue, so as to fully use a remaining time period in the time window corresponding to the TS queue other than a time period for sending the TS service packet, thereby improving scheduling efficiency of the network device.

In some embodiments, if the type of the packet is a best effort BE service packet, the packet is added to a BE queue. When the ELL queue includes no ELL service packet and a current moment is not within the time window corresponding to the TS queue, the BE service packet in the BE queue is sent. When the ELL queue includes an ELL service packet that has not been sent or the TS queue includes the TS service packet that has not been sent, the BE service packet is not allowed to be sent within the time window corresponding to the TS queue. A width of a remaining time window other than time periods for sending the TS service packet and the ELL packet may be used to send the BE service packet, so as to improve scheduling efficiency of the network device.

In some embodiments, if the type of the packet is a best effort BE service packet, the packet is added to the BE queue. When the ELL queue includes no ELL service packet, the TS queue includes no TS service packet, and the remaining time period in the time window corresponding to the TS queue is greater than or equal to a second threshold, the BE service packet in the BE queue is sent within the remaining time period in the time window corresponding to the TS queue. The second threshold is a time period required for sending one or more BE service packets in the BE queue. A width of a remaining time window other than time periods for sending the TS service packet and the ELL packet may be used to send the BE service packet, so as to improve scheduling efficiency of the network device.

In some embodiments, the TS queue includes a plurality of different TS sub-queues, and each TS sub-queue corresponds to one time window. In this case, more flexible queue scheduling can be provided. For example, the TS queue corresponds to a time window with a width of W. The time window with a width of W may be further divided into a plurality of sub-time windows corresponding to different TS sub-queues. Widths of these sub-time windows are $W_1$, $W_2$, $W_3$, . . . , and $W_n$, and a sum of the widths of these sub-time windows is less than or equal to W, that is, $W_1+W_2+W_3+ \ldots W_n \leq W$. The TS queue may include two or more different TS sub-queues, and each TS sub-queue corresponds to one time window.

In some embodiments, when the TS service packet in the TS queue is not sent within the time window corresponding to the TS queue, the ELL service packet is sent within the time window corresponding to the TS queue.

In some embodiments, when the remaining time period obtained by subtracting the time period required by the to-be-sent TS service packet from the time window corresponding to the TS queue is greater than the second threshold and the ELL queue includes no to-be-sent ELL service packet, the BE service packet in the BE queue is sent within the time window corresponding to the TS queue. The second threshold is a time period required for sending one or more BE service packets in the BE queue. A width of a remaining time window other than time periods for sending the TS service packet and the ELL packet may be used to send the BE service packet, so as to improve scheduling efficiency of the network device.

In some embodiments, the network device further includes another port. The another port and the port both are member ports of one aggregation trunk port. A plurality of BE queues are configured on the another port, and packets in the plurality of BE queues on the another port and the BE queue on the port are scheduled based on a queue priority. A trunk port is formed between a plurality of ports of the network device, and member ports of the trunk port share queue resources, so as to further optimize and improve scheduling efficiency, thereby ensuring that the ELL service packet can be sent in time with a priority as high as possible while ensuring ELL service quality. When the time window corresponding to the TS queue is idle, the BE service packet may be further sent, so as to fully use a port sending capability of the network device.

In some embodiments, when the type of the packet is an ELL service packet and the ELL queue on the port is full, the packet is added to a tail of an ELL queue on the another port. The member ports of the trunk port share queue resources, so as to further ensure that all ELL service packets can be sent fastest without affecting sending of the TS service packet.

According to a fourth aspect, a network device is provided. The network device is configured to implement the method in any one of foregoing embodiments. Alternatively, the network device may include the scheduler provided in the second aspect.

According to a fifth aspect, a computer-readable storage medium is provided. The computer-readable storage medium includes a computer program or code. When the computer program or code is executed, the method in any one of foregoing embodiments may be performed.

According to a sixth aspect, a network system is provided. The network system includes the network device in any one of the foregoing embodiments.

BRIEF DESCRIPTION OF THE DRAWINGS

To describe the technical solutions in the embodiments more clearly, the following briefly describes the accompanying drawings describing the embodiments.

DETAILED DESCRIPTION

The following describes the embodiments with reference to accompanying drawings.

The technologies described in this specification may be applied to various communications systems, for example, a current 2G or 3G communications system and a next generation communications system, such as a Global System for Mobile Communications (GSM) system, a code-division multiple access (CDMA) system, a time-division multiple access (TDMA) system, a wideband CDMA (WCDMA) system, a frequency-division multiple access (FDMA) system, an orthogonal FDMA (OFDMA) system, a single-carrier FDMA (SC-FDMA) system, a General Packet Radio Service (GPRS) system, a Long-Term Evolution (LTE) system, a packet transport network (PTN) network system, a router network system, a multi-service transmission platform (MSTP) network system, and other similar communications systems.

An OAM in this specification may be a multi-protocol label switching transport profile (MPLS-TP) OAM, an MPLS OAM, an ETH OAM, and another similar OAM.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

"First" and "second" in the embodiments do not represent a sequence. "First" and "second" in the embodiments represent different devices and information.

Time sensitive networking (TSN) is a set of bridging standards for connecting terminal nodes, and may be applied to various Ethernet protocols that support a low latency and time-based synchronous data transmission. TSN is independent of a bottom-layer communications technology. TSN may be applied to a scenario that requires a heterogeneous network and in which massive internet transmission exists.

TSN is an Ethernet standard defined by IEEE 802.1Qbv. A TSN Ethernet frame uses a conventional Ethernet frame header, and a payload of the TSN Ethernet frame may be any content. TSN devices shares a common sense of time (CST), and a precision time protocol (PTP) is used to maintain the common sense of time. The PTP specification used by TSN may be a PTP specification that complies with IEEE 802.1AS and IEEE 802.1ASRev. In TSN defined by IEEE 802.1Qbv, strict time synchronization exists, and a data group is forwarded hop by hop based on a preplanned time window, to ensure that an end-to-end latency is controllable. In the IEEE 802.1Qbv standard, each port has eight queues, and each queue has a time gating switch. A time synchronization scheduling-based scheduling algorithm 802.1Qbv is equivalent to a layer 2 time division multiplexing technology, and traffic in different time slices does not interfere with each other. Conventional QoS scheduling on an IP network can implement efficient port statistical multiplexing, can meet requirements of various topologies and priority mappings, and can serve a scenario with a high bandwidth and a large amount of user access.

The embodiments provide a port-based traffic scheduling structure on a routing device with a conventional packet switching architecture, so as to ensure hybrid forwarding and scheduling of all performance indicators of the following three Internet Protocol (IP) services: a time sensitive (TS) service, an extreme low latency (ELL) service, and a BE traffic service. In the embodiments, a statistical multiplexing QoS scheduling method and a time window scheduling method are combined for egress port traffic scheduling.

Figure 1:
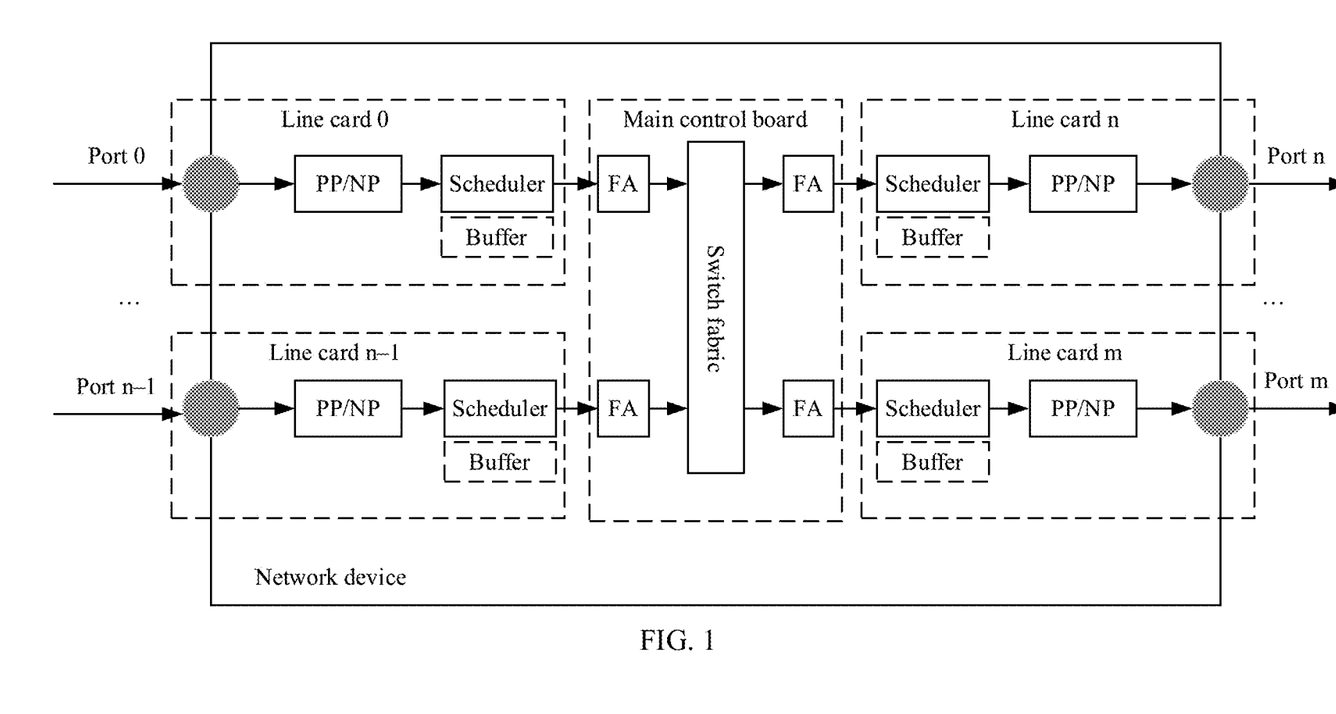
FIG. 1 is a schematic structural diagram of a network device according to an embodiment.

As shown in FIG. 1, an embodiment provides a network device. The network device includes a main control board and m line cards. The m line cards are a line card 0, a line card 1, . . . , and a line card m, where m is an integer greater than 0.

Each line card includes a port, a processor, and a scheduler. The processor may be a packet processor (PP), a network processor (NP), or a general-purpose processor, or may be a function entity with both a PP function and an NP function. The general-purpose processor may be a central processing unit (CPU). The CPU may be a single-core CPU or a multi-core CPU. Each line card may include a memory. The memory may be a buffer or an external memory. The external memory may be a 3rd generation double data rate synchronous dynamic random access memory (DDR3) memory. The plurality of line cards may alternatively share one or more memories. The port may be an optical port or an electrical port. If the port is an optical port, an optical-to-electrical converter may be further included between the port and the PP. The optical-to-electrical converter is configured to convert an optical signal entered from the optical port into an electrical signal. A PHY and a MAC may be further included between the port and the PP/NP. The PHY is configured to perform clock and data restoration and the like. The MAC is configured to detect signal integrity and a boundary of a packet entering from the port, and forward the packet to the scheduler. The PP/NP is configured to parse and classify the packet entering from the port, for example, based on a class of service (CoS). The PP/NP may require the external memory such as the DDR3 to parse and classify the packet. After being classified by the PP/NP, the packet is sent to the scheduler. The scheduler sends a classified packet to the main control board. Optionally, the scheduler may be included in a traffic manager (TM) as a function module of the TM.

The main control board includes an ingress fabric adapter (FA), a switch fabric, and an egress FA. The FA is used as an ingress and an egress of the switch fabric (SW). The packet sent by the scheduler to the main control board enters the SW through the ingress FA, and is sent to a line card corresponding to an egress port for the packet after being processed by the SW and the egress FA in sequence. The egress port is a port included in the network device and configured to send a packet. During specific implementation, after the network device receives the packet through the ingress port, the network device may determine the egress port for the packet by searching a routing table.

The scheduler on the line card corresponding to the egress port receives the packet sent by the main control board, and adds, based on the CoS or another queue priority identifier of the packet, the packet to a queue corresponding to the queue priority identifier of the packet for sending.

For packets transmitted in a specific direction, some of m ports of the network device: a port 0, a port 1, . . . , and a port m are used as ingress ports for these packets. As shown in FIG. 1, packets enter the network device from the port 0 to a port n−1 on the left. The other of the m ports may be used as egress ports for these packets. As shown in FIG. 1, the packets entering the network device from the port 0 to the port n−1 on the left may leave the network device from a port n to the port m. The port n to the port m may be considered as the egress ports for these packets. Each port may be bidirectional, and is used as an egress port and an ingress port for packets transmitted in different directions.

In some embodiments, the main control board shown in FIG. 1 further includes a processor. The processor is configured to parse and process a packet received through an ingress port, and determine to forward or discard the packet. If the packet needs to be forwarded, the processor forwards the packet to the switch fabric for processing. If the packet needs to be discarded, the processor directly discards the packet.

Figure 2:
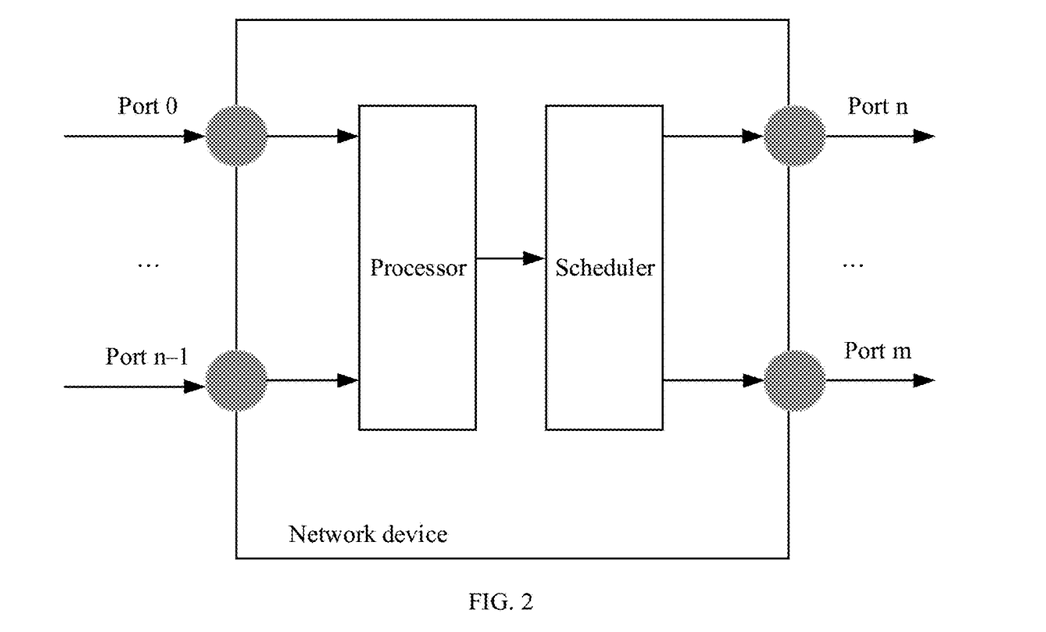
FIG. 2 is a schematic structural diagram of another network device according to an embodiment.

In some embodiments, as shown in FIG. 2, the network device includes a processor, a port and a scheduler. The processor parses and processes a packet received through an ingress port, and determine to forward or discard the packet. If the packet needs to be forwarded, the processor forwards the packet to the scheduler. The scheduler adds, based on a priority identifier carried in the packet, the packet to a queue with a corresponding priority on an egress port, and sends the packet out of the network device. The scheduler is configured to: allow a TS service packet in a time sensitive TS queue to be dequeued within a time window corresponding to the TS queue, and not allow the packet in the TS queue to be sent within a time period beyond the time window corresponding to the TS queue; and when a remaining time period obtained by subtracting a time period required by a to-be-sent TS service packet within the time window corresponding to the TS queue from the time window corresponding to the TS queue is greater than or equal to a first threshold, allow an ELL service packet in an extreme low latency ELL queue to be sent within the time window corresponding to the TS queue. The first threshold is a time period required for sending one or more ELL service packets in the ELL queue. In some embodiments, the scheduler may be implemented by hardware or software. The scheduler may be implemented by an application-specific integrated circuit (ASIC), or another integrated circuit including a microcode.

In the embodiments, an ELL queue, a TS queue, and a BE queue are configured on one or more egress ports. The ELL queue is used to send an ELL service packet, and the ELL packet is allowed to be dequeued from the ELL queue at any time without affecting sending of a TS packet, so as to leave the network device. To be specific, for a time window corresponding to a TS queue, if there is a remaining time period after a time period required by sending the TS service packet within the time window is subtracted from the time window, the ELL service packet in the ELL queue may be dequeued within the remaining time period. If there is no remaining time period after the time period required by sending the TS service packet within the time window is subtracted from the time window, the packet in the ELL queue is not allowed to be dequeued within the time window. The TS queue is used to send a TS service packet. The TS service packet in the TS queue may be dequeued from the TS queue within a time window corresponding to the TS queue, so as to leave the network device. A packet in the BE queue has a lowest priority. When the ELL queue includes no ELL service packet that needs to be dequeued and the TS queue includes no TS service packet that needs to be dequeued, the BE service packet in the BE queue is allowed to be dequeued from the BE queue, so as to send the BE service packet. When the packet in the ELL queue is sent within the time window corresponding to the TS queue, a priority of the packet in the ELL queue is higher than a priority of the packet in the TS queue. If the BE service packet is allowed to be sent within the time window corresponding to the TS queue, the priority of the ELL service packet is higher than that of the BE service packet, and the priority of the TS service packet is higher than that of the BE service packet.

In the embodiments, both "a packet is dequeued" and "a packet is sent" mean "the packet leaves a port", and both "a packet is allowed to be dequeued" and "a packet is allowed to be sent" mean that the scheduler allows the packet to leave a port to which a queue in which the packet is located belongs. The "port" may be an "egress port". The "network device" may be a router, a switch, or another device or function entity with a switching function. The switch may be an Ethernet switch or a layer 3 switch.

In some embodiments, one or more ELL queues may be configured on one egress port of the network device. Similarly, one or more TS queues may be configured on one egress port of the network device. Similarly, one or more BE queues may be configured on one egress port of the network device. If the plurality of ELL queues are configured on the egress port, each ELL queue may correspond to one ELL service. For example, an ELL queue 1 corresponds to an ELL service 1, and an ELL queue 2 corresponds to an ELL service 2. If the plurality of TS queues are configured on the egress port, each TS queue occupies one or more time windows. Each TS queue may correspond to one TS service. For example, a TS queue 1 corresponds to a TS service 1, and a TS queue 2 corresponds to a TS service 2. In the embodiments, that a queue is configured on an egress port means that a packet in the queue needs to be sent through the egress port, so as to leave the network device. During specific implementation, a line card in which the egress port is located may include a memory. The packet in the queue may be stored in the memory of the line card in which the egress port is located. The memory may be a cache.

In some embodiments, widths of time windows corresponding to different TS queues may be different. Time windows with different widths may be used to send TS service packets in different TS queues. For example, a width of a time window 1 for a TS service packet that corresponds to a TS queue used for an audio service 1 may be the same or different from a width of a time window 2 for a TS service packet that corresponds to a TS queue used for an audio service 2. The time window 1 and the time window 2 may be located at different positions on a time axis. In other words, the time window 1 and the time window 2 may correspond to different time slots. In the embodiments, a width of a time window is duration of the time window. For example, the width of the time window 1 may be 1 microsecond, and the width of the time window 2 may be 10 nanoseconds. A position of a time window on the time axis may be set. If a TS queue corresponds to a plurality of time windows, the plurality of time windows may be a plurality of consecutive time windows on the time axis, or may be a plurality of time windows that are discretely distributed in one time window cycle (TimeWindowCycle).

In some embodiments, there is a time margin in a time window corresponding to a TS queue. For example, a maximum of X TS service packets need to be dequeued within a time window (TimeWindow) corresponding to a TS queue in each time window cycle (TimeWindowCycle), and a time period of W' is required. It is assumed that the time window for the TS service within each time window is the time period W' from a moment $t_1$ to a moment $t_2$, that is, the TS service packet in the TS queue may start to be sent at the moment $t_1$ within each time window cycle, until all TS service packets that need to be sent within the time window cycle are sent. If a quantity of TS service packets that need to be sent in the TS queue reaches a maximum limit within the time window cycle, all the TS service packets in the TS queue that need to be sent within the time window cycle start to be consecutively sent at the moment $t_1$ until the moment $t_2$. Actually, within a specific time window cycle, a quantity of TS service packets that need to be dequeued from the TS queue may be less than X. Considering various factors in actual application, a time window configured for the TS queue is usually greater than W'. For example, a time window with a width of W may be configured for the TS queue. The time window with a width of W is from the moment $t_1$ within each time window cycle to a moment $t_2+\Delta x$ within the time window cycle. $\Delta x$ is a time margin, a value of $\Delta x$ may be preset, and the value of $\Delta x$ may be set to be sufficient to send one or more TS service packets in the TS queue. The width of the time window $W=t_2+\Delta x-t_1$. Normally, the TS service packets may be sent within a time width of $W'=t_2-t_1$, and the time margin $\Delta x$ may be used to send an ELL packet or a BE packet. W' herein only represents a value of the time width, and is not limited to the time period $t_2-t_1$. Actually, W' may be randomly translated within the time window with a width of $W=t_2+\Delta x-t_1$, that is, all TS service packets need to be sent in any consecutive or inconsecutive time period within the time interval $t_2+\Delta x-t_1$. A total time window width occupied to send all the TS service packets is W.

Figure 3A:
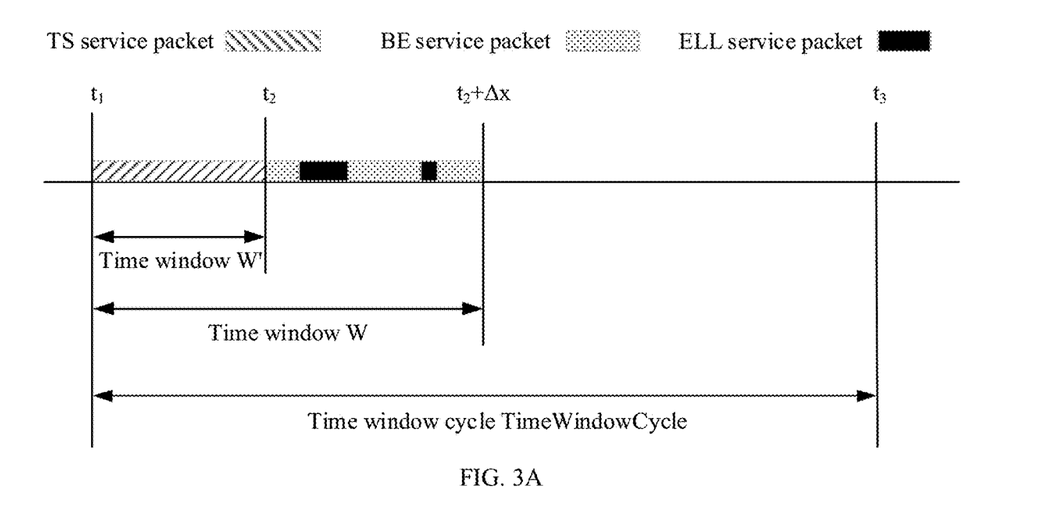
FIG. 3A to FIG. 3D are schematic diagrams of packet scheduling processes in different scenarios according to an embodiment.
Figure 3B:
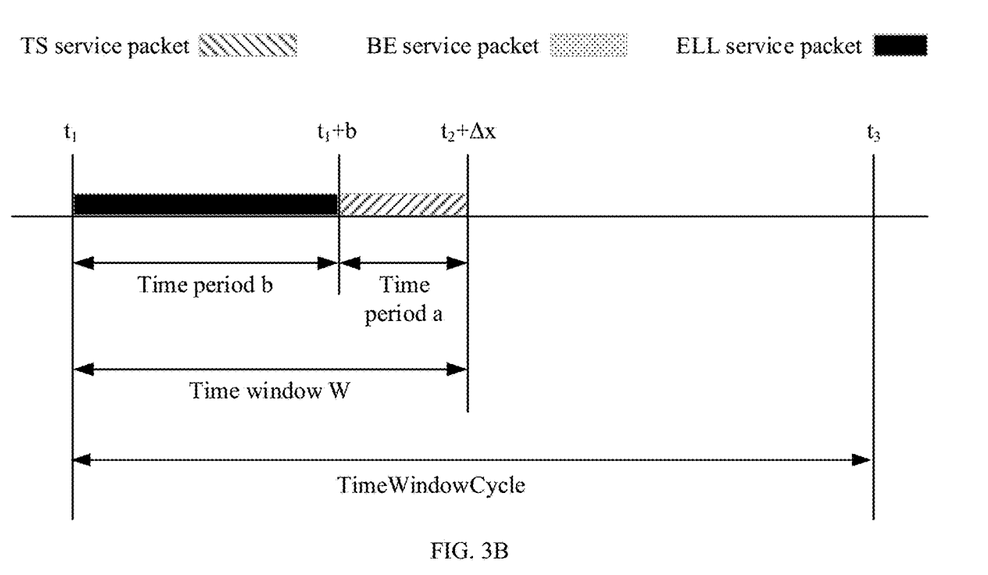
Figure 3C:
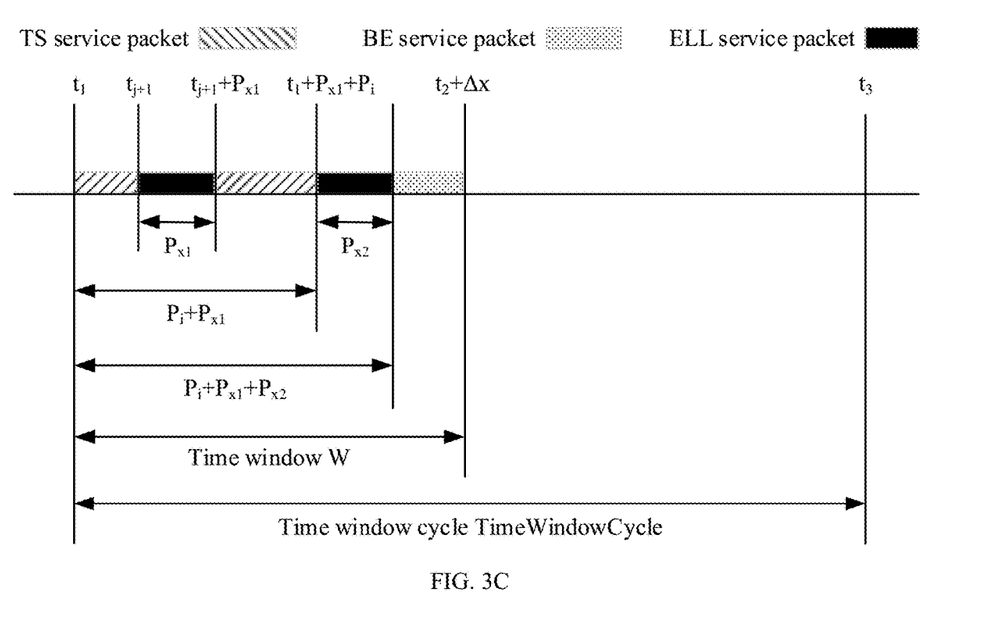

As shown in FIG. 3A to FIG. 3C, it is assumed that a dequeuing time window for a TS service packet corresponding to a TS service is from a moment $t_1$ to a moment $t_2+\Delta x$. A width of the dequeuing time window $W=t_2+\Delta x-t_1$. The following describes scheduling manners in which a TS service packet, a BE service packet, and an ELL service packet are dequeued in three scenarios. In FIG. 3A to FIG. 3C, the TS service packet is represented by a box filled with slashes, the ELL service packet is represented by a box filled with black, and the BE service packet is represented by a box filled with dots.

As shown in FIG. 3A, in the scenario 1, a time window corresponding to a TS service starts at the moment $t_1$. If one or more TS service packets corresponding to the TS service in a TS queue wait to be dequeued, and no ELL service packet in an ELL queue waits to be dequeued, from the moment $t_1$, the TS service packets corresponding to the TS service in the TS queue start to be dequeued. If no ELL service packet in the ELL queue waits to be dequeued within a time period $t_2-t_1$, the TS service packets corresponding to the TS service in the TS queue are consecutively dequeued within the time period $t_2-t_1$, until all the TS service packets corresponding to the TS service are dequeued at the moment $t_2$. If the TS queue includes no TS service packet corresponding to the TS service within a time period from the moment $t_2$ to the moment $t_2+\Delta x$, a BE packet may be dequeued. If the ELL queue includes a to-be-sent ELL packet at any moment within the time period from the moment $t_2$ to the moment $t_2+\Delta x$, a priority of the ELL packet is higher than a priority of the BE packet, and the ELL packet is first dequeued. Certainly, if there are a relatively small quantity of TS service packets, all the TS service packets may be dequeued at a moment (for example, $t_x$) before the moment $t_2$. In this case, no TS service packet corresponding to the TS service waits to be dequeued within a time period from the moment $t_x$ to the moment $t_2+\Delta x$. In this case, if the ELL queue includes a to-be-dequeued ELL service packet and a dequeuing time period is less than or equal to $t_2+\Delta x-t_x$, the ELL service packet is allowed to be dequeued without waiting for the BE service packet in a BE queue. If there is no to-be-dequeued ELL service packet, the BE service packet in the BE queue is allowed to be dequeued. If the ELL queue includes a to-be-dequeued ELL service packet at any moment within the time period from the moment $t_x$ to $t_2+\Delta x$, the priority of the ELL service packet is higher than the priority of each BE service packet in the BE queue, and the ELL service packet is first dequeued.

As shown in FIG. 3B, in the scenario 2, a time window corresponding to a TS service starts at the moment $t_1$. One or more TS service packets corresponding to the TS service in a TS queue wait to be dequeued, and n ELL service packets in an ELL queue wait to be dequeued. A total time period for which the one or more TS service packets are all dequeued is a, and a total time period for which the n ELL service packets are all dequeued is b. If a+b≤W, some of the n ELL service packets, for example, m ELL service packets, are allowed to be sent before the one or more TS packets within a time width of W−a. That is, the m ELL service packets are consecutively sent within a time period from the moment $t_1$ to a moment $t_1+W-a$. All of the one or more TS service packets are sent within a time period from the moment $t_1+W-a$ to the moment $t_2+\Delta x$. The other n−m ELL service packets are scheduled to be dequeued after the moment $t_2+\Delta x$. Both a and b are integers greater than or equal to 0, n is an integer greater than 1, and m is an integer less than n.

As shown in FIG. 3C, in the scenario 3, a time window corresponding to a TS service starts at the moment $t_1$. If i TS service packets corresponding to the TS service in a TS queue wait to be dequeued, no ELL service packet in an ELL queue waits to be dequeued, and a time period required when the i TS service packets are dequeued is $P_i$, the plurality of TS service packets are allowed to be dequeued in sequence from the moment $t_1$, that is, the i TS service packets are sent in sequence. If one ELL service packet (denoted as an ELL packet 1) in the ELL queue waits to be sent and a $j^{th}$ TS service packet in the i TS service packets is being dequeued at a moment $t_{1x}$, it is determined whether a time period $P_{x1}$ required for sending the ELL service packet 1 is less than or equal to $W-P_i$. If the time period $P_{x1}$ required for sending the ELL service packet 1 is less than or equal to $W-P_i$, the ELL service packet 1 is allowed to be dequeued at a moment before which the $j^{th}$ TS service packet is dequeued. After the ELL service packet 1 is dequeued, a $(j+1)^{th}$ TS service packet continues to be sent until all the i TS service packets are dequeued. If $P_{x1}$ is greater than $W-P_i$, after the $j^{th}$ TS service packet is dequeued, the $(j+1)^{th}$ TS service packet continues to be dequeued until all the i TS service packets are dequeued. Then, the ELL service packet is scheduled to be dequeued. If the time period $P_{x1}$ required for sending the ELL service packet 1 is less than or equal to $W-P_i$, the ELL service packet 1 is allowed to be dequeued after the $j^{th}$ TS service packet is dequeued. When the ELL service packet 1 is dequeued, another ELL service packet (denoted as an ELL service packet 2) in the ELL queue waits to be sent, and it is determined that a time period $P_xe$, required for sending the ELL service packet 2 is less than or equal to $W-P_i-P_{x1}$. In this case, after the ELL service packet 1 is dequeued, the ELL service packet 2 is allowed to be dequeued, and after the ELL service packet 2 is dequeued, the $(j+1)^{th}$ TS service packet continues to be sent until all the i TS service packets are dequeued. Similar to the process of processing the ELL service packet 1, if the time period $P_{x2}$ required for sending the ELL service packet 2 is greater than $W-P_i-P_{x1}$, the ELL service packet 2 is not allowed to be dequeued after the $j^{th}$ TS service packet is dequeued, and instead, the $(j+1)^{th}$ TS service packet is allowed to be dequeued until all the i TS service packets are dequeued. Then, the ELL service packet is scheduled to be dequeued. That is, when it is ensured that all the i TS service packets can be sent within the time window W and a remaining time period in the time window is sufficient to send the ELL service packet in the ELL queue, the ELL service packet in the ELL queue is allowed to be sent first. If it is ensured that all the i TS service packets can be sent within the time window W and the remaining time period in the time window is insufficient to send the ELL service packet in the ELL queue, the $(j+1)^{th}$ TS service packet continues to be sent until all the i TS service packets are dequeued within the time window, that is, the ELL service packet in the ELL queue is scheduled at the moment $t_2+\Delta x$. If the ELL queue includes no to-be-sent ELL service packet after the ELL service packet 1 is dequeued, the other time period $W-P_i-P_{x1}$ within the time window may be used to send a BE service packet. If the ELL queue includes no to-be-sent ELL service packet after the ELL service packet 2 is dequeued, the other time period $W-P_i-P_{x1}-P_{x2}$ within the time window may be used to send a BE service packet. At any moment within a time period from a moment $t_1+P_i+P_{x1}+P_{x2}$ to the moment $t_2+\Delta x$, if the ELL queue includes a to-be-sent ELL service packet, and a time period from the any moment to the moment $t_2+\Delta x$ is greater than and equal to a time period for which the ELL service packet is dequeued, and the priority of the ELL packet is higher than the priority of each BE packet, and the ELL packet is first dequeued.

The scheduler determines a type of a packet received by the network device. The type includes an ELL service packet, a TS service packet, and a BE service packet. If the received packet is an ELL service packet, the packet is added to an ELL queue. If the received packet is a TS service packet, the packet is added to a TS queue. If the received packet is a BE service packet, the packet is added to a BE queue. Further, the network device may schedule a packet in a packet queue, so as to send the packet in the packet queue.

Optionally, the scheduler may alternatively allocate a received packet to a more specific queue, for example, allocate an ELL service packet serving as an ELL service 1 to an ELL queue 1 corresponding to the ELL service 1 for sending.

In some embodiments, because an ELL service packet may preempt a time window corresponding to a TS queue for preferential sending, a width of the time window corresponding to the TS queue may be increased properly. The width of the time window corresponding to the TS queue is comprehensively calculated and configured based on a TSN flow feature and a burst length of the ELL queue to ensure a bounded latency of a TSN data flow. Based on a current configuration of the scheduler, relatively low upper limits of latencies of the ELL queue and the TS queue may be calculated to ensure a predictable end-to-end latency. Based on the predictable end-to-end latency, an end-to-end latency service-level agreement (SLA) is signed with a user. In some embodiments, a latency of the ELL queue (queueing delay) is affected only by interference among ELL service packets and controlled by the scheduler, and services are available at any time. A theoretical latency of the ELL queue (ELQ Delay) satisfies formula (1):

$$0 < ELQ\ \text{delay} \leq (\text{TimeWindowSize} \times \text{portRate} - \text{Credit})/\text{portRate} \quad (1)$$

TimeWindowSize is a width of a time window corresponding to a TS queue, and is measured by a time such as a nanosecond ns. For example, if a width of a time window corresponding to a TS queue is 100 ns, it indicates that a packet in the TS queue may be dequeued within the time window of 100 ns, and the packet in the TS queue is not allowed to be dequeued beyond the time window of 100 ns. portRate is a sending rate of an egress port. Credit is a time period that may be occupied by an ELL queue in a time window corresponding to each TS queue, is measured by a byte, and indicates a quantity of bytes, when a plurality of ELL service packets exist in the ELL queue and preempt the time window corresponding to the TS queue to send TS service packets, for the ELL service packets that are allowed to be sent within the preempted time window. As mentioned in the foregoing embodiment, when ELL packets preempt time periods for which TS service packets within a time window corresponding to a TS service are dequeued, it needs to be ensured that all the TS service packets corresponding to the TS service may be dequeued within the time window.

Figure 3D:
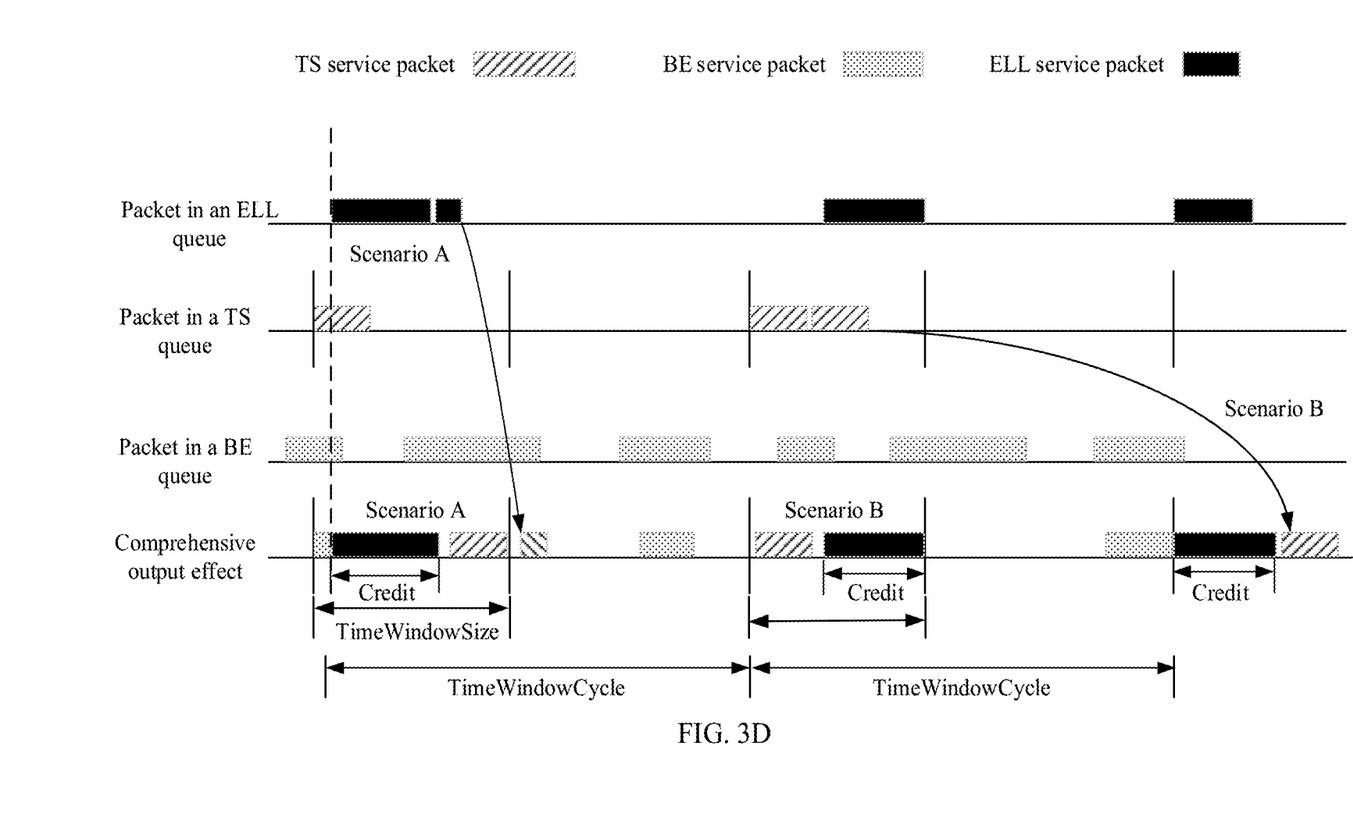

FIG. 3D shows three scenarios in which a packet is transmitted in a queue. A vertical solid line on the leftmost represents a start point of a time window, and a vertical dashed line on the right of the vertical solid line represents a moment at which a specific event occurs. For example, the specific event may be as follows: If a TS service packet is being dequeuing, but an ELL service packet that suddenly arrives needs to be dequeued immediately within a time window, some bandwidths in the sending time window corresponding to a TS queue is preempted for sending the ELL service packet. In FIG. 3D, a TS service packet is represented by a box filled with slashes, an ELL service packet is represented by a box filled with black, and a BE service packet is represented by a box filled with dots.

It can be learned from the formula (1) that, in the scenario A shown in FIG. 3D, a maximum latency of an ELL queue occurs when an ELL service packet is ready to be output, Credit in a time window corresponding to a TS queue is run out, and the ELL service packet in the ELL queue can only wait until a next time window corresponding to the TS queue starts. Therefore, a maximum waiting time of the ELL service packet is (TimeWindowSize×portRate−Credit)/portRate.

It is assumed that each TS queue is configured with an independent time window to ensure a latency, but is subject to limited interference from the service packet in the ELL queue. A theoretical latency of the TS queue (TS Delay) satisfies formula (2):

$$0 < TS\ \text{delay} \leq (\text{TimeWindowCycle} - \text{TimeWindowSize} - \text{Credit}/\text{portRate}) \quad (2)$$

TimeWindowCycle is a total width of time windows corresponding to all TS queues, and is measured by a time such as a nanosecond (ns). TimeWindowSize is a width of a time window corresponding to a TS queue, and is measured by a time. Credit is a time period that may be occupied by an ELL queue in a time window corresponding to each TS queue, is measured by a byte, and indicates a quantity of bytes, when a plurality of ELL service packets exist in the ELL queue and preempt the time window corresponding to the TS queue to send TS service packets, for the ELL service packets that are allowed to be sent within the preempted time window. portRate is a sending rate of an egress port, which is measured by a byte.

It can be learned from the formula (2) that, in the scenario B shown in FIG. 3D, a maximum latency of a TS queue occurs when a TS service packet in the TS queue is ready to be output, there is no sufficient TS queue bandwidth in a time window corresponding to the TS queue to send the TS service packet in the TS queue, and the remaining bandwidth within the time window corresponding to the TS queue is ready to be used to send an ELL service packet or a BE service packet. Therefore, a maximum waiting time Tmaxwait of the TS queue is determined according to formula (3):

$$\text{Tmaxwait} = \text{TimeWindowCycle} - \text{TimeWindowSize} + \text{Credit} \times 2/\text{portRate} \quad (3)$$

Therefore, the ELL service packet can still be sent in time even in the scenario A. In the scenario B, a shorter latency of the TS service packet can be obtained, and overall transmission efficiency of various queue packets is ensured. The comprehensive output effect as shown in FIG. 3D shows that the solutions in the embodiments effectively improve transmission efficiency of various types of queue packets, and more packets are sent within a unit time while sending requirements of various types of packets are met.

An embodiment provides a packet scheduling method. The method may be applied to the network device shown in FIG. 1, FIG. 2, FIG. 4, or FIG. 5 and the scenarios shown in FIG. 3A to FIG. 3D. The following uses the network device in FIG. 4 as an example to describe the method. The method includes the following steps.

S10: Determine a type of a received packet.

When receiving the packet, the network device parses the packet to determine the type of the packet. The type of the packet includes an ELL service packet or a TS service packet. Certainly, this type may also include a BE service packet.

S12: Allocate the packet to a queue corresponding to the type of the packet.

In S10, if the network device determines that the received packet is an ELL service packet, the network device allocates the received packet to an ELL queue. If the network device determines that the received packet is a TS service packet, the network device allocates the received packet to a TS queue. If the network device determines that the received packet is a BE service packet, the network device allocates the received packet to a BE queue.

Optionally, if an egress port includes a plurality of ELL queues, each ELL queue corresponds to one ELL service. If the network device determines that the type of the received packet is a first-type ELL service packet, the network device allocates the packet to an ELL queue 1 corresponding to the first-type ELL service packet for sending.

Figure 4:
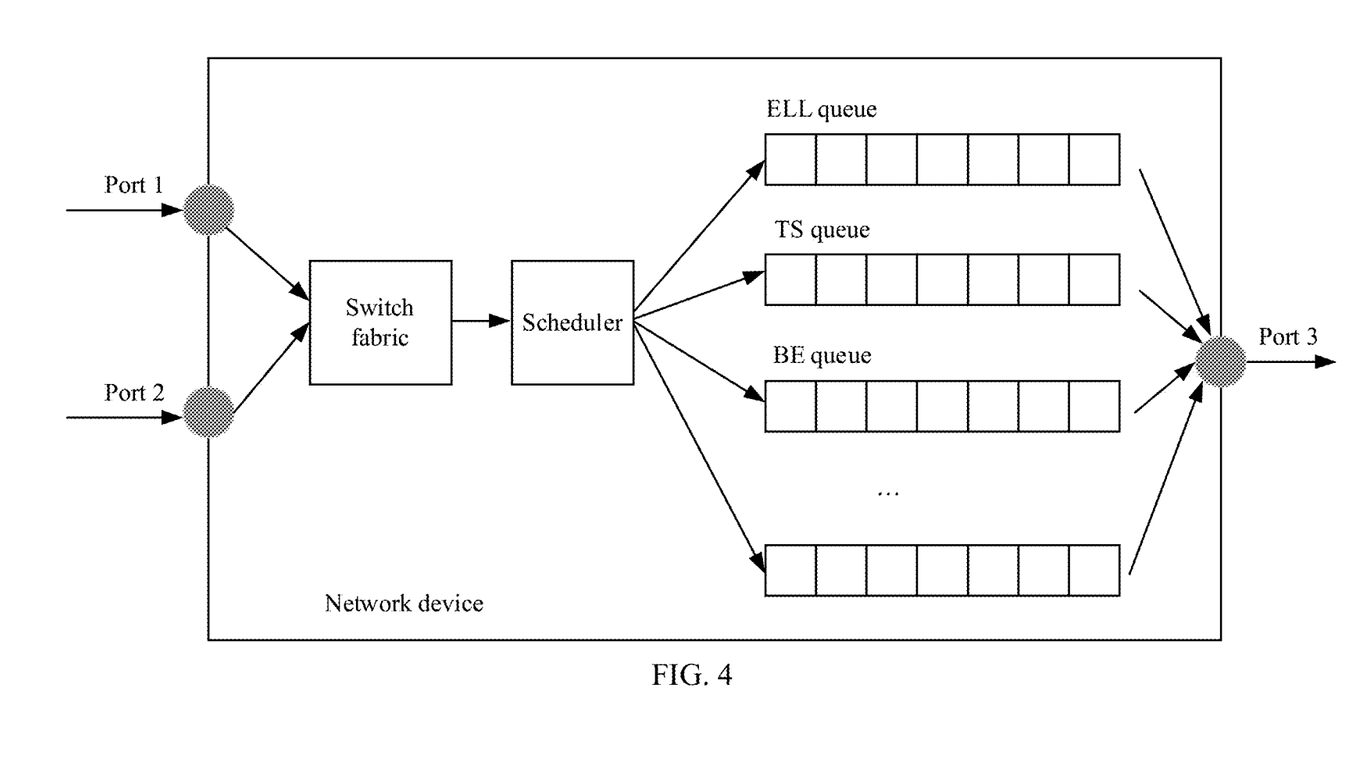
FIG. 4 is a schematic structural diagram of still another network device according to an embodiment.

Optionally, if the egress port includes a plurality of TS queues, each TS queue corresponds to one TS service and to one time window. If the network device determines that the type of the received packet is a first-type TS service packet, the network device allocates the packet to a TS queue 1 corresponding to the first-type TS service packet for sending at a start moment T1 of the corresponding time window. If no ELL service packet waits to be sent in an ELL queue on an egress port 3 at the moment T1, the TS service packet in the TS queue 1 is sent at the moment T1. If any ELL service packet waits to be sent in the ELL queue on the egress port 3 at the moment T1, the ELL service packet is sent first to leave the port 3, and the TS service packet is sent at a start moment T1' of a next time window corresponding to the TS queue 1 after the ELL service packet is sent.

If the packet is a BE service packet, the packet is allocated to a BE queue. If there is no packet in an ELL queue on an egress port 3 at any moment and the any moment is not within a time window corresponding to a TS queue, the packet in the BE queue is sent.

Figure 5:
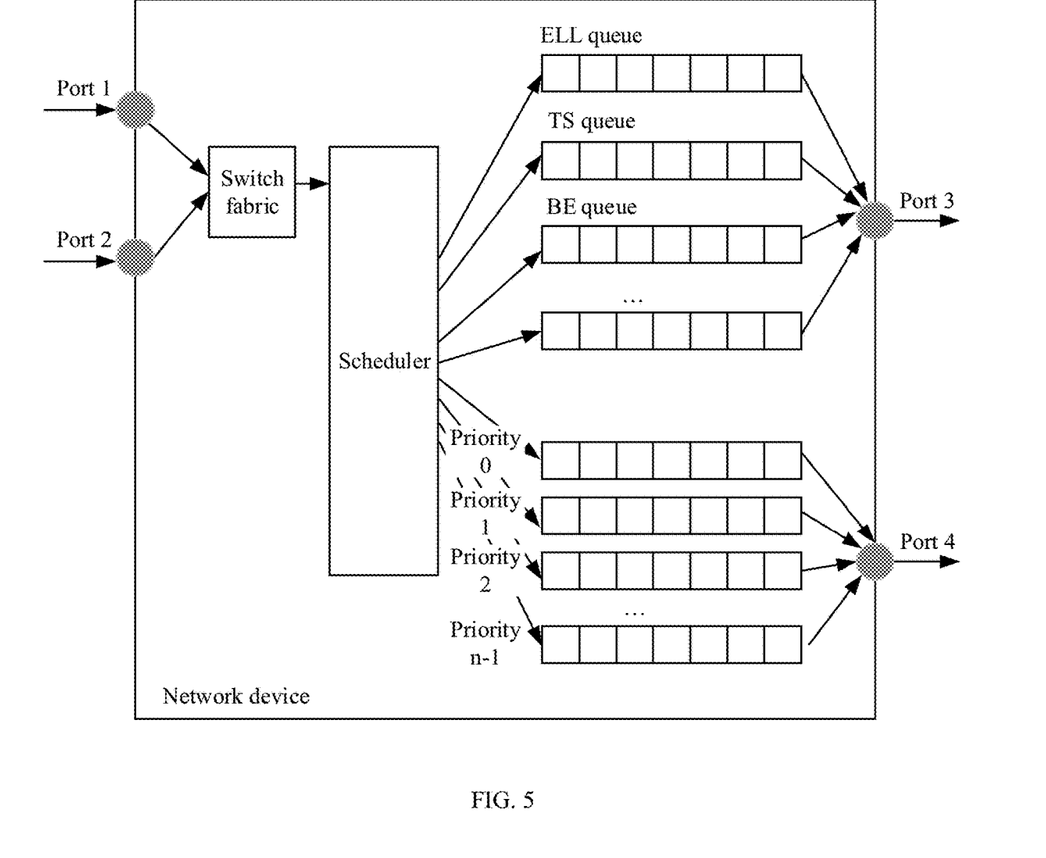
FIG. 5 is a schematic structural diagram of still another network device according to an embodiment.

As shown in FIG. 5, in some embodiments, the network device further includes an egress port 4. The egress port 3 and the egress port 4 are member ports of an aggregation trunk port, and the trunk port may further include other ports. On the egress port 4, n queues: $Q_0, Q_1, \ldots,$ and $Q_{n-1}$ are deployed. The n queues have different priorities. For example, a priority of $Q_0$ is a priority 0, and a priority of $Q_1$ is a priority 1. It is assumed that $Q_0$ with the priority 0 is a queue with a highest priority in the n queues. Neither an ELL queue nor a TS queue is deployed on the egress port 4. Queue resources on the ports 3 and 4 may be shared. The scheduler may send the ELL service packet through the plurality of queues on the ports 3 and 4. When the packet received by the network device is an ELL service packet and all ELL queues on the egress port 3 include to-be-sent ELL service packets, the scheduler may schedule the received ELL service packet to the port 4 and add the packet to a tail of the queue with a highest priority (that is, the queue $Q_0$) on the port 4, so that the ELL service packets can be sent more quickly.

S14: Send the packet in the queue to which the packet belongs.

A packet in the ELL queue is dequeued earlier than any packet in the TS queue and any packet in the BE queue, without affecting timely dequeuing of a TS service packet in the TS queue, that is, without lowering QoS of the TS service packet in the TS queue. To be specific, when the ELL queue includes a to-be-dequeued packet and no TS service packet enters a dequeuing time window, the packet in the ELL queue is scheduled to be dequeued to leave the egress port of the network device without waiting for the packet in the TS queue and the packet in the BE queue. When the ELL queue includes no to-be-dequeued packet, the packet in the TS queue is scheduled to be dequeued to leave the egress port of the network device within the time window corresponding to the TS queue. When the ELL queue includes no packet and a current moment is not within the dequeuing time window corresponding to the TS queue, the packet in the BE queue is scheduled to be dequeued to leave the egress port of the network device.

If the received packet is an ELL service packet, the packet enters the ELL queue and is scheduled to be dequeued earlier than the packet in the TS queue and the packet in the BE queue. If the received packet is a TS service packet, the packet enters the queue, and can be scheduled to be dequeued within the time window corresponding to the TS queue only after there is no to-be-dequeued ELL service packet. If the received packet is a BE service packet, the BE service packet can be scheduled to be dequeued only when there is no to-be-dequeued ELL service packet and a current moment is not within the time window for the TS service packet.

Different to-be-dequeued ELL service packets in the ELL queue may be scheduled based on various algorithms, such as a weighted round robin (WRR) algorithm.

Different to-be-dequeued TS service packets in the TS queue may be scheduled based on a TS algorithm, so that the packets are dequeued within corresponding time windows. For example, three different types of TS service packets (denoted as a first-type TS service packet, a second-type TS service packet, and a third-type TS service packet) in the TS queue from head to tail wait to be scheduled in sequence. The first-type TS service packet, the second-type TS service packet, and the third-type TS service packet respectively correspond to a dequeuing time window WTS1, a dequeuing time window WTS2, and a dequeuing time window WTS3. Therefore, the first-type TS service packet can be scheduled to be dequeued only within the time window WTS1, and cannot be scheduled to be dequeued within other time windows such as WTS2 and WTS3. The second-type TS service packet can be scheduled to be dequeued only within the time window WTS2, and cannot be scheduled to be dequeued within other time windows such as WTS1 and WTS3. The third-type TS service packet can be scheduled to be dequeued only within the time window WTS3, and cannot be scheduled to be dequeued within other time windows such as WTS1 and WTS2.

Different to-be-dequeued BE service packets in the BE queue may be scheduled based on various algorithms, such as the WRR algorithm.

In an embodiment, a plurality of TS queues may be configured on the network device, and store TS packets that are scheduled to be dequeued within different time windows. For example, a first TS queue stores a packet that is scheduled to be dequeued within a time window P1, the second TS queue stores a packet that is scheduled to be dequeued within a time window P2, and the third TS queue stores a packet that is scheduled to be dequeued within a time window P3. The time windows P1, P2 and P3 are different time windows.

According to the method and the network device in the embodiments, a dedicated ELL queue is set for an ELL service packet with a highest priority with reference to a time window solution and a priority preemption manner in TSN. In addition, when there are a relatively large quantity of ELL service packets in the ELL queue, the received ELL service packet may be sent through a TS queue and a BE queue in a preemption manner, so as to ensure that the ELL service packet is sent first. A dedicated TS queue is configured for a TS service packet on the egress port, and the TS service packet is sent within a time window corresponding to the TS service packet, thereby fully ensuring timely sending of audio and video packets.

In the foregoing embodiments, the network device may be a routing device or a switching device.

Another embodiment provides a network device. The network device is a virtual network device. The virtual network device includes a virtual port, a scheduler, and a processor. The virtual port is a logical port, and may be mapped to a corresponding physical port. The virtual network device may be a vSwitch deployed on a server. A process in which the virtual network device processes a packet queue is similar to that of the network device shown in FIG. 1, FIG. 2, and FIG. 5. Details are not described herein again.

A person skilled in the art may make various modifications and variations to the embodiments provided. The processor in the foregoing embodiments may be a microprocessor or any conventional processor. The steps of the method disclosed with reference to the embodiments may be directly performed by a hardware processor, or may be performed by using a combination of hardware in the processor and a software module. When it is implemented by using software, code that implements the foregoing functions may be stored in a computer-readable medium. The computer-readable medium includes a computer storage medium. The storage medium may be any available medium accessible to a computer. By way of example but not limitation, the computer-readable medium may be a random-access memory (RAM), a read-only memory (ROM), an electrically erasable programmable ROM (EEPROM), a compact disc ROM (CD-ROM) or other optical disk storage, a disk storage medium or other disk storage, or any other medium that can be used to carry or store program code in a form of a command or a data structure and can be accessed by a computer. The computer-readable medium may be a compact disc (CD), a laser disc, an optical disc, a Digital Video Disc (DVD), a floppy disk, or a Blu-ray disc.

What is claimed is:

1. A method comprising:
   receiving a packet;
   determining a type of the packet;
   adding, when the type is an extreme low latency (ELL) service, the packet to an ELL queue;
   adding, when the type is a time sensitive (TS) service, the packet to a TS queue, wherein a first priority of the ELL service is higher than a second priority of the TS service;
   sending, when the type is the TS service, the packet within a time window corresponding to the TS queue;
   avoiding sending, when the type is the TS service, the packet beyond the time window; and
   sending, when the type is the ELL service and when a condition is met, the packet within the time window,
   wherein the condition is that a remaining time period is greater than or equal to a first threshold,
   wherein the remaining time period is based on subtracting a first time period required by a to-be-sent TS service packet within the time window from the time window, and
   wherein the first threshold is a second time period required for sending ELL service packets in the ELL queue.

2. The method of claim 1, further comprising sending the packet from the ELL queue and in the time window.

3. The method of claim 1, further comprising:
   adding, when the type is a best effort (BE) service, the packet to a BE queue;
   sending, when the ELL queue comprises no ELL service packet, a current moment is not within the time window, and the type is the BE service, the packet; and
   avoiding sending, when the type is the BE service and when either the ELL queue comprises an unsent ELL service packet or the TS queue comprises an unsent TS service packet, the packet within the time window.

4. The method of claim 1, further comprising:
   adding, when the type is a best effort (BE) service, adding the packet to a BE queue; and
   sending, when the type is the BE service, the ELL queue comprises no ELL service packet, the TS queue comprises no TS service packet, and the remaining time period is greater than or equal to a second threshold, the packet within the remaining time period,
   wherein the second threshold is a third time period required for sending one or more BE service packets in the BE queue.

5. The method of claim 1, wherein the TS queue comprises TS sub-queues corresponding to time windows.

6. The method of claim 1, further comprising sending, when the type is the ELL service and when a TS service packet in the TS queue is not sent within the time window, the packet within the time window.

7. The method of claim 1, further comprising:
   adding, when the type is a best effort (BE) service, the packet to a BE queue; and
   sending, when the type is the BE service, the remaining time period is greater than a second threshold, and the ELL queue comprises no to-be-sent ELL service packet, the packet within the time window,
   wherein the second threshold is a third time period required for sending one or more BE service packets in the BE queue.

8. A computer program product comprising instructions that are stored on a non-transitory computer-readable medium and that, when executed by a processor, cause a network device to:
   allow a time sensitive (TS) service packet in a TS queue to be dequeued within a time window corresponding to the TS queue;
   not allow the TS service packet to be sent within a time period beyond the time window; and
   allow, when a remaining time period based on subtracting a first time period required by a to-be-sent TS service packet within the time window from the time window is greater than or equal to a first threshold, an extreme low latency (ELL) service packet in an ELL queue to be sent within the time window,
   wherein a first priority of the ELL service packet is higher than a second priority of the TS service packet,
   wherein the first threshold is a second time period required for sending ELL service packets in the ELL queue.

9. The computer program product of claim 8, wherein the instructions, when executed by the processor, further cause the network device to send the ELL service packet in the time window.

10. The computer program product of claim 8, wherein the instructions, when executed by the processor, further cause the network device to:
    send, when the ELL queue comprises no ELL service packet and a current moment is not within the time window, a best effort (BE) service packet in a BE queue; and
    avoid sending, when the ELL queue comprises the ELL service packet or the TS queue comprises the TS service packet, the BE service packet within the time window.

11. The computer program product of claim 8, wherein the instructions, when executed by the processor, further cause the network device to send, when the ELL queue comprises no ELL service packet, the TS queue comprises no TS service packet, and the remaining time period is greater than or equal to a second threshold, a best effort (BE) service packet in a BE queue within the remaining time period, wherein the second threshold is a third time period required for sending one or more BE service packets in the BE queue.

12. The computer program product of claim 8, wherein the TS queue comprises TS sub-queues corresponding to time windows.

13. The computer program product of claim 8, wherein the instructions, when executed by the processor, further cause the network device to send, when the TS service packet is not sent within the time window, the ELL service packet within the time window.

14. The computer program product of claim 8, wherein the instructions, when executed by the processor, further cause the network device to send, when the remaining time period is greater than a second threshold and the ELL queue comprises no to-be-sent ELL service packet, a best effort (BE) service packet in a BE queue within the time window, and wherein the second threshold is a third time period required for sending one or more BE service packets in the BE queue.

15. A network device comprising:
    a first port configured to receive a packet;
    a processor coupled to the first port and configured to determine a type of the packet; and
    a scheduler coupled to the processor and configured to:
        add, when the type is an extreme low latency (ELL) service, the packet to an ELL queue; and
        add, when the type is a time sensitive (TS) service, the packet to a TS queue, wherein a first priority of the ELL service is higher than a second priority of the TS service, wherein the first port is further configured to:
            send, when the type is the TS service, the packet within a time window corresponding to the TS queue;
            avoid sending, when the type is the TS service, the packet beyond the time window; and
            send, when the type is the ELL service and when a condition is met, the packet within the time window,
        wherein the condition is that a remaining time period is greater than or equal to a first threshold,
        wherein the remaining time period is based on subtracting a first time period required by a to-be-sent TS service packet within the time window from the time window, and
        wherein the first threshold is a second time period required for sending ELL service packets in the ELL queue.

16. The network device of claim 15, wherein the first port is further configured to send the packet from the ELL queue and in the time window.

17. The network device of claim 15, wherein the scheduler is further configured to add, when the type is a best effort (BE) service, the packet to a BE queue, and wherein the first port is further configured to:
    send, when the ELL queue comprises no ELL service packet, a current moment is not within the time window, and the type is the BE service, the packet; and
    avoid sending, when the type is the BE service and when either the ELL queue comprises an unsent ELL service packet or the TS queue comprises an unsent TS service packet, the packet.

18. The network device of claim 15, wherein the scheduler is further configured to add, when the type is a best effort (BE) service, the packet to a BE queue, wherein the first port is further configured to send, when the type is the BE service, the ELL queue comprises no ELL service packet, the TS queue comprises no TS service packet, and the remaining time period is greater than or equal to a second threshold, the packet within the remaining time period, and wherein the second threshold is a third time period required for sending one or more BE service packets in the BE queue.

19. The network device of claim 15, wherein the TS queue comprises TS sub-queues corresponding to time windows.

20. The network device of claim 15, further comprising a second port, wherein the first port and the second port are members of an aggregation trunk port, and wherein the scheduler is further configured to schedule additional packets in a first best effort (BE) queue on the first port and in a second BE queue on the second port based on a queue priority.

21. The network device of claim 15, further comprising a second port, wherein the first port and the second port are members of an aggregation trunk port, and wherein the scheduler is further configured to add, when the type is the ELL service and when the ELL queue is full, the packet to a tail of an additional ELL queue on the second port.

* * * * *